(No Model.) 4 Sheets—Sheet 1.
G. J. CAPEWELL & W. G. ALLEN.
MACHINE FOR MAKING WIRE SPOKES FOR BICYCLES, &c.
No. 563,221. Patented June 30, 1896.
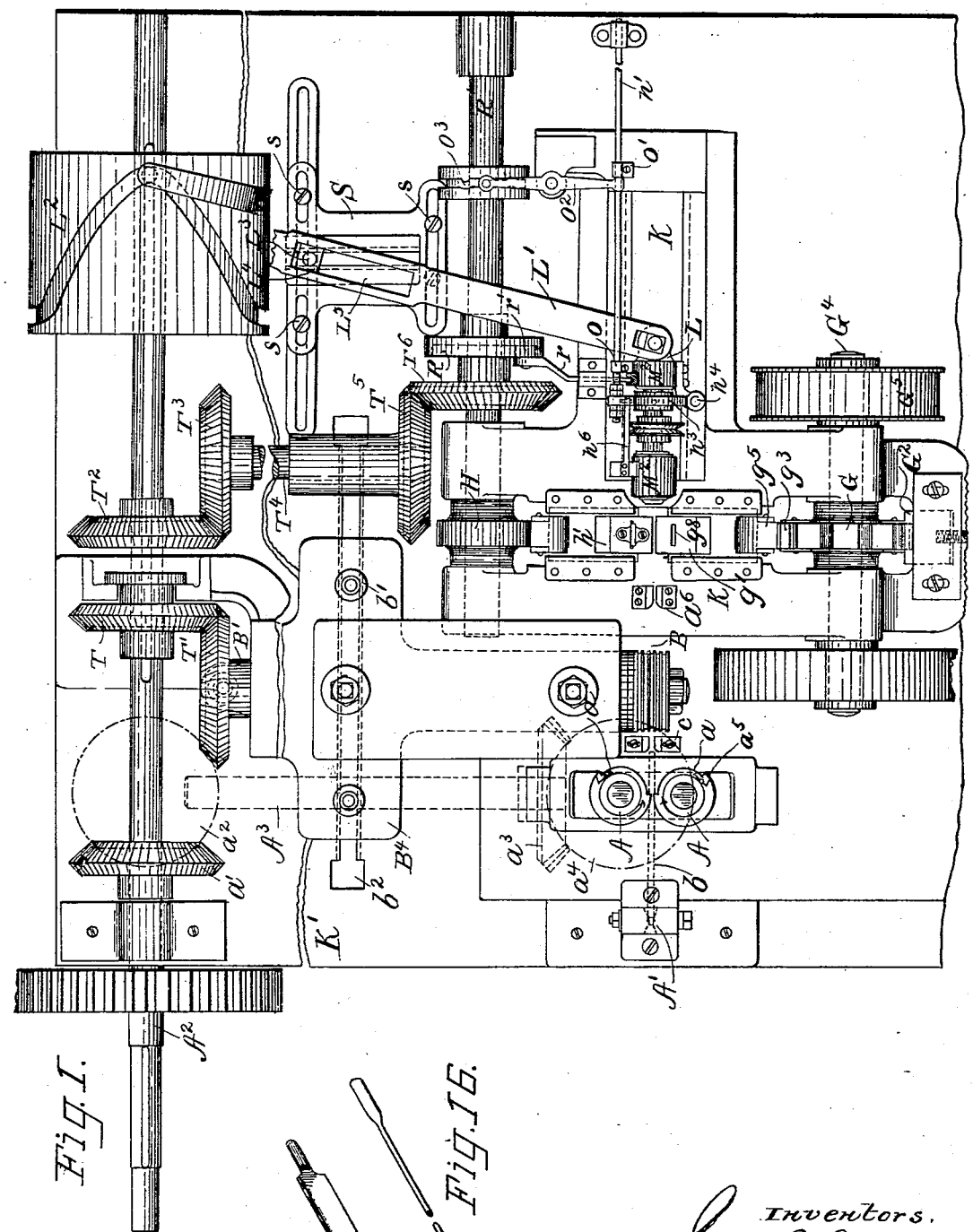
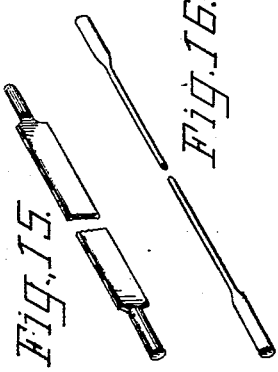
Witnesses.
Inventors.
George J. Capewell
& William G. Allen
by Pollok & Mauro
their attorneys

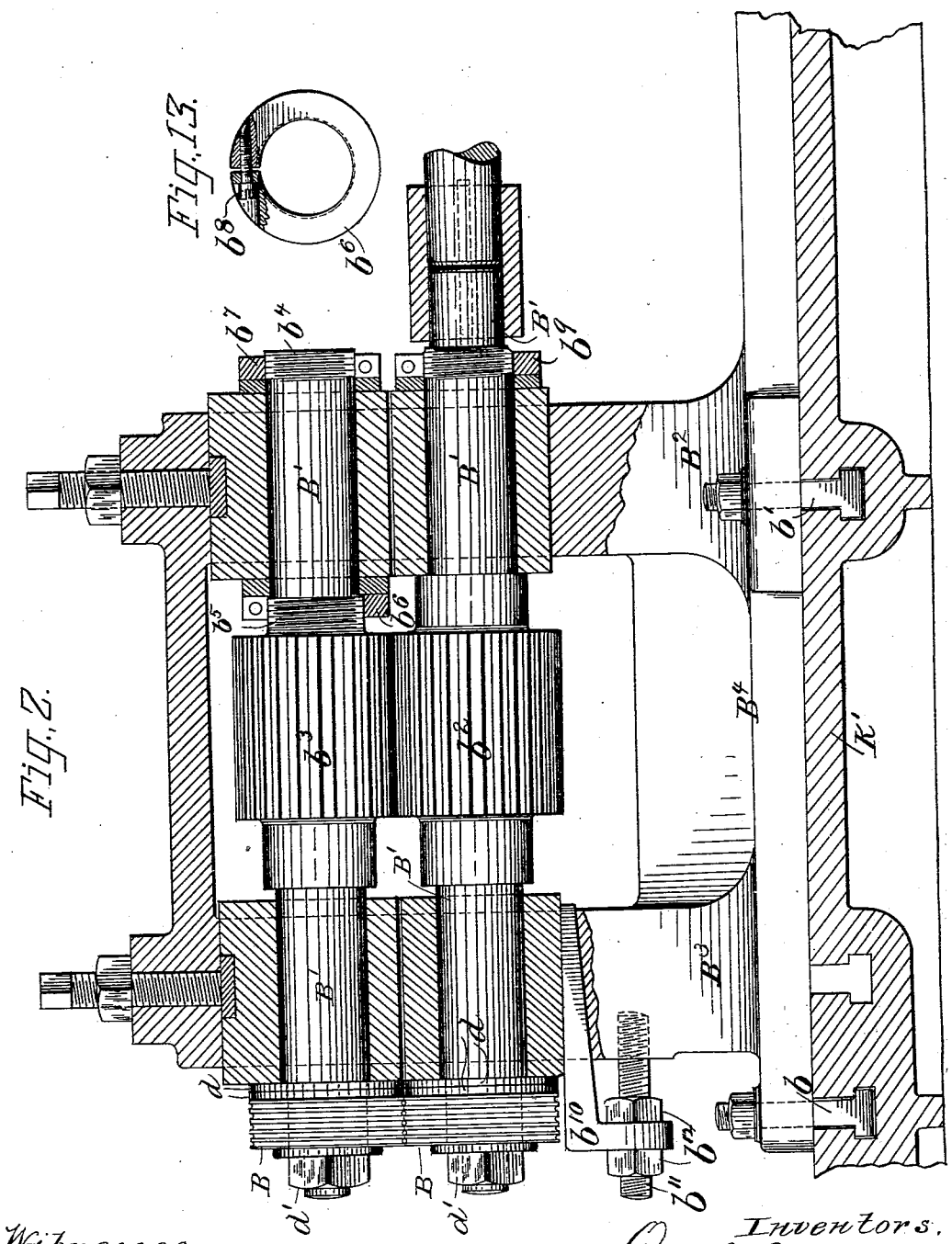

(No Model.) 4 Sheets—Sheet 3.
G. J. CAPEWELL & W. G. ALLEN.
MACHINE FOR MAKING WIRE SPOKES FOR BICYCLES, &c.
No. 563,221. Patented June 30, 1896.
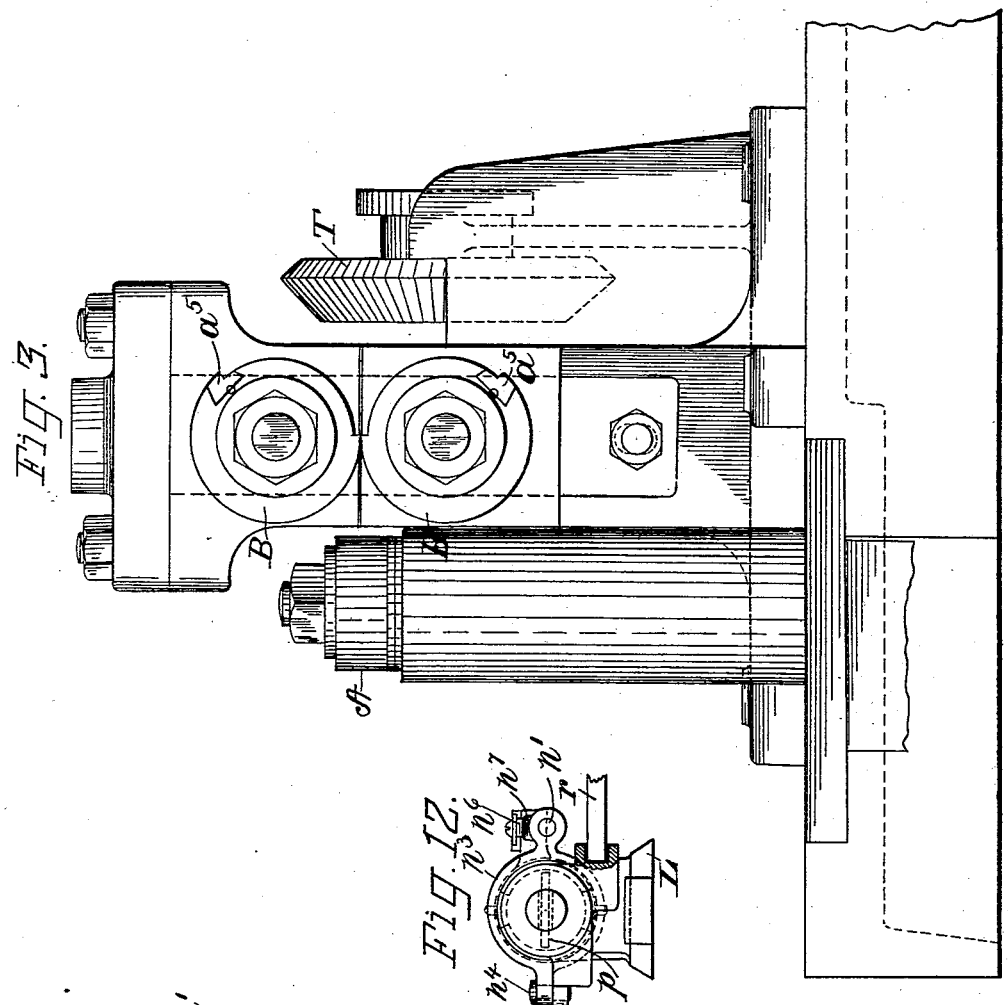
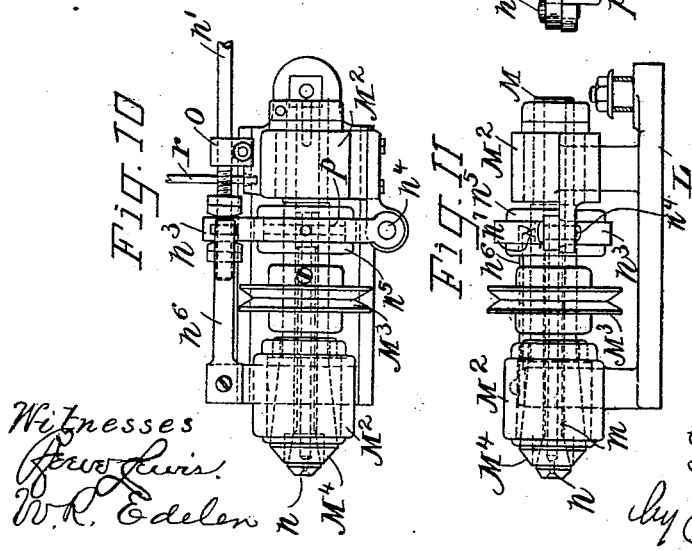
Witnesses
Perry Lewis
W. R. Edelen
Inventors.
George J. Capewell
& William G. Allen
by Pollok & Mauro
their attorneys.

(No Model.) 4 Sheets—Sheet 4.
G. J. CAPEWELL & W. G. ALLEN.
MACHINE FOR MAKING WIRE SPOKES FOR BICYCLES, &c.
No. 563,221. Patented June 30, 1896.
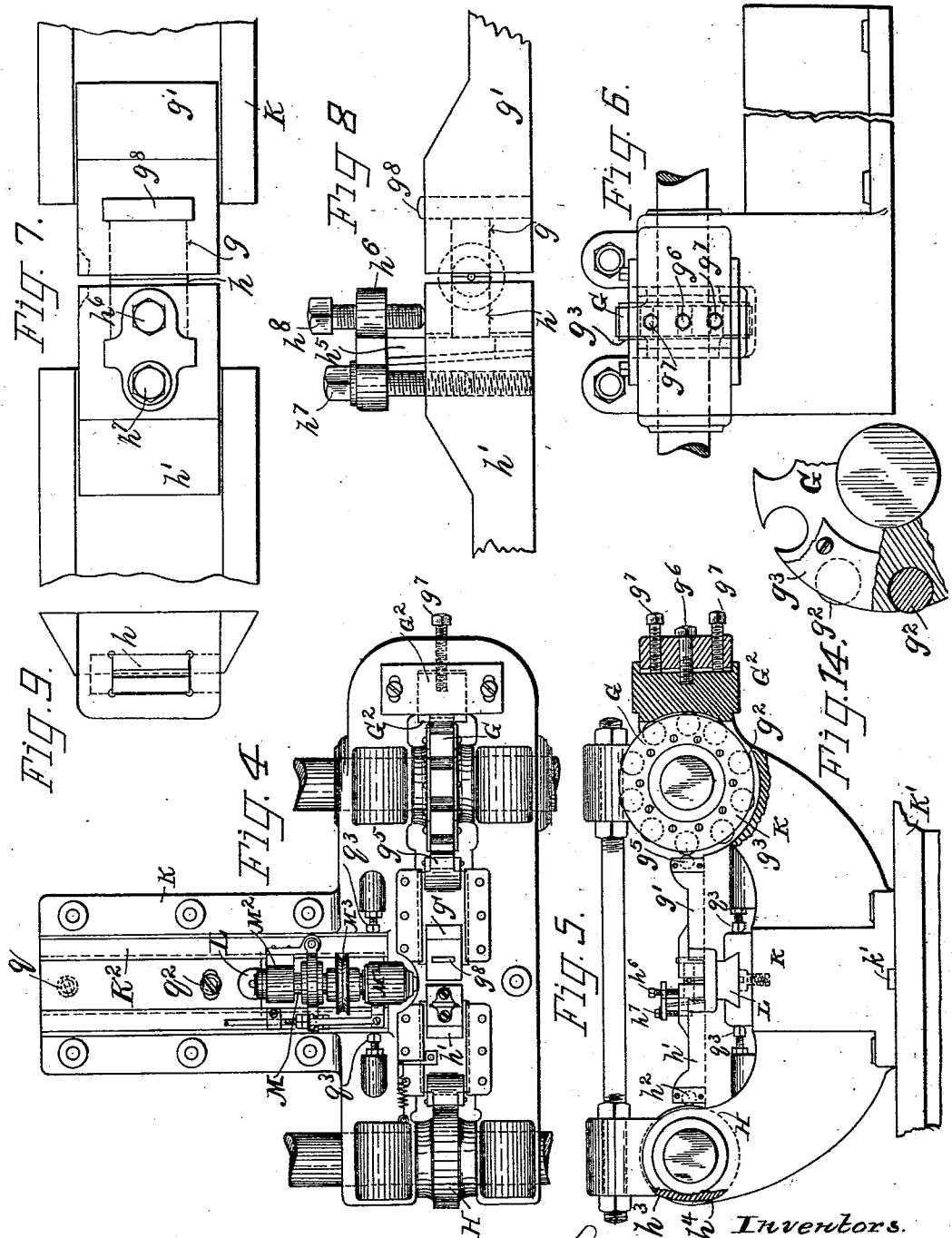
Witnesses
Inventors.
George J. Capewell
William G. Allen
by Pollok & Mauro
their attorneys

UNITED STATES PATENT OFFICE.

GEORGE J. CAPEWELL AND WILLIAM G. ALLEN, OF HARTFORD, CONNECTICUT, ASSIGNORS TO THE AMERICAN SPECIALTY COMPANY, OF CONNECTICUT.

MACHINE FOR MAKING WIRE SPOKES FOR BICYCLES, &c.

SPECIFICATION forming part of Letters Patent No. 563,221, dated June 30, 1896.

Application filed April 1, 1896. Serial No. 585,788. (No model.)

*To all whom it may concern:*

Be it known that we, GEORGE J. CAPEWELL and WILLIAM G. ALLEN, of Hartford, Connecticut, have invented new and useful Improvements in Machines for Making Wire Spokes for Bicycles, &c., which are fully set forth in the following specification.

This invention has reference to the manufacture of wire spokes for wheels of bicycles and other vehicles, and its principal object is to accomplish the production of these articles in a rapid and economical manner.

Spokes for bicycle-wheels are made from steel wire, and the principal qualities required of them are lightness and strength. The wire stock from which the spokes are made is cut up into pieces of suitable length, (considerably shorter than the length of the finished spoke,) and the thickness of the piece is then reduced for the greater portion of its length, leaving the ends of larger diameter, this reduction of diameter being attended by the elongation of the piece. One end is then threaded for engagement with the rim of the wheel, and the other is usually provided with a head, by means of which it is connected to the hub of the wheel.

The most effectual means heretofore applied for reducing the middle portion of the spoke is by swaging in a machine similar to needle-swaging machines, the wire being subjected to repeated and very rapid blows from vibratory dies, these dies being reciprocated by a series of balls or rollers carried in a ring-shaped support and successively acting upon the rear ends of the dies. The result of this operation is, besides reducing and elongating the wire, to compress the fiber and to impart to the surface a high finish. The operation, of course, is comparatively slow, admitting of the production of about one spoke a minute. Moreover, in reducing by this means the diameter of the wire to the required extent the compression of the metal and the concussion to which it is subjected are likely to be carried farther than the limit at which the greatest tensile strength is developed. The machine, on account of the severity of the operation, wears rapidly and is liable to breakage, and the necessary adjustment of the dies, as the reduction of the wire proceeds, is difficult to secure in a satisfactory manner.

According to the present invention, the wire, after being cut to the proper length, is reduced between the ends very nearly (say within one or two thousandths of an inch) to the desired diameter, this operation being performed by means of two pairs of rolls, the axes of the second pair being at right angles to those of the first pair. Any suitable mechanism may be used to feed the wire stock to the machine and to cut it off to the proper lengths.

In the machine hereinafter explained in detail, and which exhibits the best embodiment of our invention now known to us, the first pair of rolls flatten the wire between its ends while elongating it, and the second pair restore the circular form while further elongating it. The object of this construction will be evident upon brief explanation. If rolls with a circular pass were brought to act on the wire at an intermediate point, they would cut into the wire, besides raising two large fins, but by first flattening the portion to be reduced and then acting on the edges of the flattened portion with rolls at right angles to the first pair the desired result is effected.

Special features of construction, hereinafter explained, are adopted, whereby the action of the rolls is exerted only upon the intermediate portion of the wire, whereby the wire is brought to the proper length, whereby the rolls, while turning continuously, operate without mutual interference, and whereby the machine may be adjusted to produce different sizes of spokes. Other features of novelty in this portion of the machine will be hereinafter explained.

The wire passing from the second pair of rolls is fed by the latter to the swaging device, the relations of these mechanisms being such that the rolls deliver the wire in just the proper position for the beginning of the swaging action. The forward end of the wire is grasped by a gripping device (which may be in the form of a chuck, or set of spring-jaws, or of other suitable form) and thereby carried at the proper rate of speed between the swaging-dies. The wire, during this part of its travel, is rapidly rotated. The result is the same as when the dies are rotated, but in the preferred form of machine it is more convenient to rotate the device which feeds the wire.

When the wire is delivered from the swaging device, it is completely finished over the surface of the reduced portion and over the surface of the shoulders joining such reduced portion to the enlarged ends. It only remains to finish the ends, which require separate operations not forming part of this invention.

It is obvious that the speed of movement of the wire through the swaging device is very many times greater than the maximum speed possible when the reduction is effected by swaging. As the rolls operate simultaneously with the swaging device, no additional time is consumed by them.

In addition to the great economy and increased product thus effected, the finished spokes are believed to have greater tensile strength than those heretofore made, the working or forging under the blows of the dies not being excessive.

The invention embraces not only the combinations of the elements constituting the complete organized machine, but also special improvements, which may be advantageously used in machines devised for special uses other than making wheel-spokes. In the swaging device, as hereinafter described in detail, one of the dies is rapidly vibrated, while the other die is relatively stationary during the swaging operation. The latter die, however, is provided with automatic regulating or adjusting devices for controlling its position with respect to the vibratory die. Thus in making spokes the space between the dies is at first a little wider than the diameter of the enlarged ends of the spokes, then it gradually diminishes to the diameter desired for the intermediate portion of the spoke, remaining at that size until near the end of such portion, when it again enlarges to the diameter of the end of the spoke. This adjusting device may be, and preferably is, in the form of a cam properly constructed to set the adjustable die at its respective working positions with reference to the different portions of the stock on which it acts.

The action of the vibratory die is preferably effected by a cam of special construction, comprising a disk-shaped support provided with a series of rollers near the periphery and projecting beyond the same a proper distance to give to the die a blow of the desired force. Special means are provided to take the shock of the blow off the shaft of the die, and other improvements are embraced in this part of the invention, which will be explained hereinafter.

The invention includes certain other specific improvements in parts, details, and combinations, which can be most conveniently described in connection with the accompanying drawings, which illustrate a spoke-making machine constructed in accordance with the invention in the form best known to us.

Figure 1 is a plan view, partly broken away and contracted, embodying the various improvements embraced in this invention. Fig. 2 is an elevation, partly in section, of the operating mechanism for the grooved rolls. Fig. 3 is an end view from the left of Fig. 2, showing also the flattening-rolls. Fig. 4 is a plan view of the swaging mechanism and the gripping device for drawing the spokes through between the dies of said mechanism. Fig. 5 is an elevation of the same, partly in section. Fig. 6 is an elevation taken from the right of Fig. 5. Figs. 7 and 8 are respectively a plan and side elevation, enlarged, showing the mounting of the swaging-dies. Fig. 9 is an end view of one of the dies. Figs. 10, 11, and 12 are respectively a plan, side elevation, and end view of the gripping device for drawing the spokes through the swaging mechanism. Fig. 13 is a detail of one of the adjustable collars used on the shafts of the grooved rolls. Fig. 14 is a detail of the actuating-wheel for the reciprocating die. Fig. 15 shows a length of wire as it appears after passing through the flattening-rolls, and Fig. 16 shows a spoke as it is delivered from the machine.

A represents a pair of rolls on vertical axes, to which the wire stock, severed into pieces of proper lengths, is fed continuously.

Any suitable feed mechanism may be employed to deliver the stock to the rolls, and as such mechanism is common and forms no part of this invention it is not shown in the drawings.

A' represents a cutter, of any ordinary description, for severing the wire stock into proper lengths. It acts just as the rolls A take hold of the wire.

Rolls A have plain or smooth surfaces, so that they simply flatten the wire in passing between them. The surfaces of the rolls are cut away, as shown at $a$, leaving acting surfaces extending part way (in this case nearly half-way) around the rolls. The length of the acting surface must correspond to the length of the portion of the wire to be reduced. When the cut-away portions of rolls A are opposite each other, a blank $b$ is fed in and left in the position shown in Fig. 1, with the forward end projecting a proper distance beyond the center of the rolls. The latter seize the blank and, besides flattening it, feed it into the second set of rolls B, which are so positioned and timed in their operation that their acting surfaces come into operation just after the rolls A release the stock.

Rolls A are driven from the main shaft $A^2$ by means of bevel-gears $a'$ $a^2$, cross-shaft $A^3$, and bevel-gears $a^3$ $a^4$, the latter being on the shaft of one of rolls A. The construction and operation of the driving mechanism are, of course, matters of minor importance.

The distance between the primary rolls A and secondary rolls B must be such that the stock, when released by the former, will be advanced to such a point that the beginning of the flattened portion will be just in the bite of rolls B. In order to adapt the machine to making spokes of different lengths, rolls B, with their support, are adjustable on the bed of the machine toward and from rolls A. To this end the casting or frame $B^4$, supporting the horizontal rolls B, is secured to the bed $K'$ by means of bolts $b'$, which pass through a slot $b^2$ in the bed-plate of the machine.

Between rolls A and rolls B is a small spring friction-guide $c$ to keep the wire from twisting and to insure its being delivered to rolls B with its flat faces in a vertical plane.

It is very desirable that the same rolls should be available for use in making spokes of different lengths, as the expense of providing a separate pair of rolls for each size of spoke would be very great. To this end we have devised means whereby the acting surfaces of the rolls (A and B) may be increased or diminished in length. This feature of the invention is illustrated in Figs. 1 and 3.

Each roll is provided with an extension-block $a^5$, set into a dovetailed socket at one end of the acting surface of the roll, and having a portion of such acting surface. The length of the acting surface may therefore be varied by using different blocks, a number of which may be furnished for each roll, the several blocks, of course, having extension acting surfaces of various lengths.

The stock $b$, after passing through the rolls A, is somewhat elongated and brought to the shape shown in Fig. 15. Rolls B are fluted or grooved, as shown, and act upon the edges of the flattened portion of the stock. The elongation is mainly effected by rolls B.

In addition to the adjustment of the length of acting surface of the rolls, already explained, several other adjustments are provided. One of these adjustments has for its object to bring the grooves in one roll exactly opposite to or in register with those of the other roll, and this adjustment has for its object to enable the same rolls to be used to produce spokes of different diameters.

As shown in Fig. 2, the rolls B are mounted each on a shaft $B'$, journaled in bearings in standards $B^2$ $B^3$. The shaft of the lower roll is driven by bevel-gears T T', Fig. 1, from the main shaft $A^2$, and drives the upper-roll shaft by means of gears $b^2$ $b^3$, Fig. 2.

The adjustment for effecting the exact alinement or register of the grooves in the rolls B is provided for by forming screw-threads $b^4$ $b^5$ respectively, on the upper shaft B at the sides of standard $B^2$. These threads are engaged by corresponding threads in collars $b^6$ $b^7$, which are transversely split at one side and connected by screws $b^8$, (see Fig. 13,) whereby the collars may be tightly fixed on the shaft. By loosening screw $b^8$ and turning the collars the shaft may be given a limited longitudinal adjustment. A collar $b^9$, similar to collars $b^6$ $b^7$, is arranged on lower shaft $B'$ to take up wear.

To take up wear between the peripheral surfaces of the rolls B, the bearing of the lower shaft $B'$ in the standard $B^3$ rests upon a wedge-shaped block $b^{10}$, which may be adjusted to raise said bearing by a bolt $b^{11}$ and nuts $b^{12}$. This adjustment is, of course, very slight.

Rolls B are, as shown, bolted on the ends of their respective shafts, two washers $d$ being interposed between the roll and an annular shoulder or abutment on the shaft, the rolls being secured by nuts $d'$. Each roll has five grooves or flutings, which, though of different sizes, are the same distance apart from center to center. The washers $d$ are each of a thickness equal to this distance. The center groove is that which is in the line of action. By removing one washer $d$, the adjacent groove on one side can be brought to the working position, and by simply turning the roll around the corresponding groove on the other side can be brought to working position. Removal of both washers permits either of the outside grooves to be used. By using two washers an adjustment to any one of several grooves may be obtained, or if there are but three grooves the adjustment may be effected by a single washer.

Between rolls B and the swaging device is another small friction-guide $a^6$, by which the partly-finished spoke is supported until seized by the clutch hereinafter described.

Rolls B are so arranged with reference to the swaging device as to deliver the stock between the swaging-dies while the latter are open, with the enlarged forward end projecting beyond the dies. In this position the feeding device seizes the forward end of the wire, drawing it between the dies, while rapidly turning it, until the enlarged rear end of the stock reaches the dies, at which moment the dies separate to allow this end of the spoke to pass.

Leaving the feed mechanism for the moment, the construction and operation of the swaging mechanism will next be explained.

The die $g$ is herein termed the "vibratory" die, and die $h$ the "adjustable" or "anvil" die. These dies are carried, respectively, by slides $g'$ $h'$, supported so as to move freely in ways of the frame K. Die $g$ receives its rapid vibratory movement from a large rotating disk or wheel G, provided with a series of cam-projections $g^2$ in the form of rollers set into sockets in the wheel or support G, (see Fig. 14,) and successively striking against the roller $g^5$ in the end of slide $g'$.

Wheel G has an annular web of reduced thickness at its periphery, and through this web are bored the holes for rollers $g^2$, which are placed loosely therein. They are retained in place by holding-rings $g^3$, one on each side. (See Figs. 6 and 14.) The rollers $g^2$ and $g^5$ both turn in striking, constantly presenting fresh surfaces and reducing friction. It is desirable to take the shock, so far as possible, off the shaft of wheel G. To this end we place on the opposite side of the wheel from the die a bearing block or support $G^2$, which is concaved vertically to fit the wheel, and the rollers $g^2$ roll over this concave face. Block $G^2$ is held in a socket in the frame by means of screw $g^6$, and it may be adjusted by means of said screw and set-screws $g^7$. Slide $h'$ is also provided with a roller $h^2$ on its end to receive the action of cam H. The function of this cam is to set the die $h$ at its different working positions during the process of swaging a spoke.

Fig. 5 shows the die in the position it occupies while the body of the shank is being swaged. When the cam has made nearly half a revolution from that position, the incline $h^3$ permits die $h$ to recede, and separating the dies so that the enlarged rear end of the spoke passes from between them, and the enlarged forward end of the next spoke enters. Incline $h^4$ now comes into action, gradually closing die $h$ upon die $g$, until they are at the right distance apart to form the body of the spoke. A spoke is finished at each revolution of cam H, which turns at the same axial speed as the rollers A and B.

Figs. 7, 8, and 9 show how the dies are set in their slides or supports. The end of the slide is provided with a rectangular socket of the proper width and height to receive the die. Behind die $g$, in a recess in slide $g'$, is a backing-plate $g^8$ of hardened steel to receive the thrust of the die, the latter being loose in its socket. Die $h$ is provided with an adjustment to take up wear, and to compensate for regrinding the dies. To this end the back plate $h^5$ is wedge-shaped, and the recess in which it fits is also inclined. Plate $h^5$ has a cross-piece $h^6$ at the top, through which passes an adjusting-screw $h^7$, which engages in a threaded socket in the slide $h'$, and a set-screw $h^8$, which bears at its end against the top of said slide, whereby wedge $h^5$ is firmly clamped in its adjusted position.

The swaging device as a whole is supported on a frame K, which rests on the bed K' of the machine and is provided with a groove engaging a rib or spline $k'$ on the bed, whereby the swaging device can be set closer to or farther from the rolls B, according to the length of spoke that is being made.

The feed mechanism for carrying the stock through the dies comprises a slide L, Figs. 1 and 4, moving in ways in the frame K, said slide making a complete reciprocation back and forth to each revolution of the main shaft. The slide receives its movement through a long arm or lever L' from a cam $L^2$ on the main shaft, the arm being fulcrumed at $L^3$. Slide L carries a hollow spindle M, supported in bearings $M^2$ on the slide, and rotated by means of a pulley $M^3$. At the forward end of the spindle, inside the forward bearing $M^2$, is a head $M^4$, having a flaring opening. Within the hollow spindle is a rod $m$, having on its forward end split spring-jaws $n$, forming a chuck for grasping the end of the wire spoke. In operation, as the slide advances the jaws are open. When the slide comes to rest, the spoke having entered the jaws, the latter are drawn into the hollow head, the bevel of the latter causing the jaws to close firmly upon the spoke. The slide then retracts, drawing the spoke through the dies, the spindle M being in constant rotation. When the slide reaches the limit of its rearward motion, the chuck-rod is pushed forward, and the jaws springing open release the spoke.

The devices for automatically opening and closing the chuck-jaws may be constructed in different ways. As herein shown a rod $n'$ gives to the chuck the slight motion necessary to open and close the jaws. Rod $n'$ has two adjustable stops $o$ $o'$. When the slide has advanced, as in Fig. 1, stop $o'$ is in contact with the end of a lever $o^2$, the other end of which engages in a cam-groove $o^3$. At this instant lever $o^2$, actuated by cam $o^3$, pushes rod $n'$ to the rear, drawing in and closing the jaws. When slide L has fully retreated, a reverse movement is given to rod $n'$ by action of lever $o^2$ on stop $o$. Connection between rod $n'$ and chuck-rod $m$ is made in the following way: Rod $n'$ is attached to an arm $n^3$, pivoted at $n^4$ to an upright on slide L. Arm $n^3$ carries a yoke which embraces a collar $n^5$, which is loose and free to slide on spindle M. A pin $p$ passes through chuck-rod $m$ and has a limited movement lengthwise of the spindle in a slot therein, this movement being sufficient for the opening and closing of the chuck-jaws. Arm $n^3$ has a small lug $n^7$, which is engaged by a spring-catch $n^6$, attached at one end to the bearing $M^2$. When rod $n'$ has been pulled back, catch $n^6$ engages the front side of lug $n^7$ and prevents the chuck from moving out of the head. When rod $n'$ is moved in the opposite direction, catch $n^6$ springs on the other side of the lug and holds the chuck-jaws open.

In order that the backward movement of arm $n'$ may not move the slide, the latter is locked in position when lever $o^2$ acts on stop $o'$. This is effected by a locking-arm $r$, which at the proper moment drops into a notch in a block on the rear bearing $M^2$, Fig. 1. The other end of arm $r$ carries a pin or roller $r'$, which enters a groove of proper shape in cam R on shaft R', which also carries the cam $o^3$. Cam R is so constructed as to move the locking-arm into engagement with the lock at the proper moment.

It has been stated that the anvil-die $h$ can be adjusted to compensate for wear on both dies. Such adjustment necessitates a corresponding adjustment of the feed devices to keep the axis of the chuck always in line with the axis of the dies. To this end the slideway $K^2$, upon which slide L works, can be adjusted slightly on base K. Slideway $K^2$ is attached to the base by a pin $q$ and screws $q^2$, the latter passing through slots in the slideway. By loosening the screws the desired adjustment can be effected, the slideway turning on pin $q$ as a pivot. When properly adjusted, the screws $q^3$, one on each side of the slideway, are brought to bear on the sides thereof and hold it firmly in position. (See Fig. 4.) The adjustment of the throw of slide L is provided for by making the fulcrum $L^3$ of arm $L'$ adjustable lengthwise of said arm. The latter is slotted or grooved, and in the slot or groove is a square block $L^4$, perforated to receive the journal-pin $L^3$. This pin is journaled in a support S, and may be set nearer to or farther from the cam $L^2$, as desired. Support S is itself adjustable in a line parallel with the main shaft, being secured to the bed by means of bolts $s$ passing through slots in the support S, or in the bed, or in both.

The connections and gearing for driving the various parts of the machine are clearly shown on the drawings.

The gearing for driving the rolls has already been explained. Shaft $R'$, which carries cams H, R, and $o^3$ is driven by bevel-gears $T^2 T^3$, cross-shaft $T^4$, and bevel-gears $T^5 T^6$. All the gears on the main shaft are adjustable lengthwise thereof. Shaft $G^4$, which carries cam G, is driven by a belt on band-pulley $G^5$.

It will be seen that three revolutions of the main shaft carries a blank entirely through the machine and completes it. At the first revolution it passes through rolls A, at the second through rolls B, and at the third through the swaging device. Consequently at each complete revolution a finished spoke will be delivered.

The details of construction may be greatly modified without departing from the spirit of the invention, and it is obvious that many of the improvements herein described are susceptible of use without the others, and for purposes other than the manufacture of spokes.

Having thus described our invention, what we claim as new, and desire to secure by Letters Patent, is—

1. In a machine for making wire spokes or similar articles required to have a reduced diameter for a portion of their length, the combination of a pair of flattening-rolls having acting surfaces extending a part way around their peripheries, being thereby adapted to act upon a portion only of the wire, and a second pair of rolls having a circular pass, the acting surfaces thereof extending part way around the rolls, for further reducing the flattened portion of the wire, substantially as described.

2. In a machine for making wire spokes or similar articles, the combination of a pair of flattening-rolls having acting surfaces extending part way around their peripheries, so as to act upon and flatten the wire for a portion only of its length, and a second pair of rolls having each a semicircular groove extending part way around the roll, for acting upon and reducing to circular cross-section the portion of wire flattened by the first rolls, the axes of the two pairs of rolls being at right angles to each other, substantially as described.

3. In a machine for making wire spokes or similar articles, the combination of a pair of rolls having acting surfaces extending part way around their peripheries, so as to act upon and flatten a portion only of the wire passing between them, and a second pair of rolls having each a semicircular groove extending part way around its periphery, the axes of the second rolls being at right angles to the first, and the two pairs of rolls being relatively timed as specified so that the action of one pair of rolls begins after that of the other ends, substantially as described.

4. The combination of two pairs of rolls acting successively on the wire stock, said rolls having their peripheries partly cut away so as to act upon a portion only of the stock, and driving mechanism rotating said rolls in such relation to each other that the acting surfaces of each pair come into operation when the other is out of action, substantially as described.

5. The combination of two pairs of rolls acting successively on the wire stock, said rolls having their peripheries partly cut away so as to act upon a portion only of the stock, and being arranged with the axes of one pair at right angles to the axes of the other, and driving mechanism rotating said rolls continuously in such relation to each other that the acting surfaces of each pair come into operation when the other is out of action, substantially as described.

6. A pair of reducing-rolls having acting surfaces extending part way around their peripheries, the rolls having each a removable extension-block set into the roll, a portion of the outer surface of the block being coincident with the acting surface and forming part thereof, so that by changing the block the length of acting surface may be varied, substantially as described.

7. In a wire-rolling mill, the combination with a pair of reducing-rolls having their peripheries divided into acting and non-acting surfaces, of removable blocks set into said rolls at the junction of these two surfaces and having a surface coincident with each, substantially as described.

8. In a wire-rolling mill, the combination with a pair of roll-shafts, of rolls removably secured on the ends of said shafts and having a series of grooves, said rolls being reversible, and removable spacing-washers, between said rolls and shoulders or abutments on said shafts, whereby the rolls may be adjusted to bring any one of the grooves into the line of action, substantially as described.

9. In a machine for making wire spokes or similar articles, the combination with reducing-rolls having acting and non-acting surfaces arranged to act upon a portion of the wire stock, of a swaging device, feed mechanism for carrying the stock through the swaging device, and actuating mechanism for said rolls and swaging device, substantially as described.

10. In a machine for making wire spokes or similar articles, the combination of the flattening-rolls, the grooved reducing-rolls, and the swaging-dies, acting successively upon the stock, with feed mechanism for advancing the stock, and actuating mechanism for said rolls and dies, substantially as described.

11. The combination of the flattening-rolls having acting and non-acting surfaces, the grooved reducing-rolls having acting and non-acting surfaces, mechanism for driving said rolls in such relation to each other that each pair is acting while the other is out of action, swaging-dies receiving the stock from the second pair of rolls, and means for feeding the stock between the dies, substantially as described.

12. The combination with reducing-rolls having part of their peripheries cut away, so as to act upon a portion only of the stock, of swaging-dies between which the rolls deliver the stock, means for separating the dies to admit and pass the large end of the stock, feed mechanism for the stock, and actuating mechanism for the dies, substantially as described.

13. The combination with the reducing-rolls for reducing the shank or intermediate portion of the stock, of a pair of swaging-dies, means for automatically adjusting one of the dies to different working positions relatively to the other, so that the dies may be separated to pass the large end of the stock, and brought together again, means for rapidly vibrating the other die, and mechanism for feeding the stock between the dies, substantially as described.

14. The combination of pairs of flattening and reducing rolls, having acting surfaces extending part way only around their peripheries, said pairs of rolls being relatively adjustable according to the length of spoke to be made, substantially as described.

15. The combination with pairs of flattening and reducing rolls having acting surfaces extending part way only around their peripheries, of a swaging device adjustable relatively thereto, substantially as described.

16. In a machine for making wire spokes or similar articles, the combination with flattening-rolls, reducing-rolls, and a swaging device, all adjustable relatively to each other, the rolls being cut away so as to act upon a portion only of the wire blank, of feeding devices for carrying the stock through the dies, means for imparting the necessary movement to said devices and for adjusting the extent of movement thereof, as and for the purpose set forth.

In testimony whereof we have signed this specification in the presence of two subscribing witnesses.

GEORGE J. CAPEWELL.
WILLIAM G. ALLEN.

Witnesses:
CHAS. FLINT,
JOHN G. HAWLEY.